(12) United States Patent
Gregory et al.

(10) Patent No.: US 7,013,640 B2
(45) Date of Patent: Mar. 21, 2006

(54) STIRLING ENGINE ASSEMBLY

(75) Inventors: Adam Richard Gregory, Coalville (GB); Julie Patricia Hyde, Solihull (GB); David Anthony Clark, Hugglescote (GB)

(73) Assignee: Microgen Energy Limited, (GB)

( * ) Notice: Subject to any disclaimer, the term of this patent is extended or adjusted under 35 U.S.C. 154(b) by 0 days.

(21) Appl. No.: 10/491,516

(22) PCT Filed: Oct. 2, 2002

(86) PCT No.: PCT/GB02/04446

§ 371 (c)(1),
(2), (4) Date: Apr. 2, 2004

(87) PCT Pub. No.: WO03/029639

PCT Pub. Date: Apr. 10, 2003

(65) Prior Publication Data

US 2004/0261410 A1 Dec. 30, 2004

(30) Foreign Application Priority Data

Oct. 4, 2001 (GB) .................................. 0123881

(51) Int. Cl.
*F01B 29/10* (2006.01)

(52) U.S. Cl. ............................. 60/517; 60/524; 60/526

(58) Field of Classification Search ................... 60/517, 60/520, 524, 526
See application file for complete search history.

(56) References Cited

U.S. PATENT DOCUMENTS

| 2,157,229 A | * | 5/1939 | Bush .............................. 60/682 |
| 3,042,390 A | * | 7/1962 | Rausch et al. ............... 266/179 |
| 3,568,573 A | * | 3/1971 | Bailey et al. ................ 92/171.1 |
| 4,120,161 A | * | 10/1978 | Gedeit ........................... 60/682 |
| 4,485,628 A | | 12/1984 | Jones |
| 4,677,825 A | * | 7/1987 | Fellows ........................ 60/525 |
| 4,756,332 A | | 7/1988 | Grasseschi |
| 4,774,808 A | | 10/1988 | Otters |
| 5,743,091 A | * | 4/1998 | Penswick et al. ............ 60/517 |

FOREIGN PATENT DOCUMENTS

| DE | 34 12 312 A | 10/1985 |
| JP | 07 217744 A | 8/1995 |

* cited by examiner

*Primary Examiner*—Hoang Nguyen
(74) *Attorney, Agent, or Firm*—Needle & Rosenberg, P.C.

(57) ABSTRACT

A seal between the head of a Stirling engine (1) and surrounding burner assembly (2). The seal comprises an annular trough (11) attached to one component and filled with a viscous liquid (14), and an annular blade attached to the other component inserted into the viscous liquid. This forms a seal to the gas path between the engine and burner.

6 Claims, 2 Drawing Sheets

US 7,013,640 B2

STIRLING ENGINE ASSEMBLY

CROSS REFERENCE TO RELATED APPLICATIONS

The present application claims priority to Great Britain Application No. 0123881.5, filed Oct. 4, 2001, which application is incorporated herein fully by this reference.

The present invention relates to a Stirling engine assembly, and, in particular, to a Stirling engine assembly suitable for use in domestic combined heat and power (DCHP).

A Stirling engine is an externally heated reciprocating engine. It has a cylinder within which oscillation of a piston or pistons serves to move working fluid between hot and cold heat exchangers and provide power.

Heat is generally supplied to one end of the cylinder of the Stirling engine in order to heat the gas inside and drive the working piston. The end of the Stirling engine which is heated is called a heat transfer head and is generally surrounded by an annular heater or burner which supplies heat to the transfer head. For DCHP applications the cylinder is generally arranged vertically so that hot exhaust gases from the burner escape more quickly.

The interface between the burner and the heat transfer head must be sealed in order to prevent combustion gases flowing downwardly and escaping from the system.

As the Stirling engine contains reciprocating components, it is provided with a vibration reduction system incorporating various damping and absorbing components to bring the residual levels of vibration to a low level. However, the level of vibration is still high enough to cause problems for any seal located between the vibrating engine and the stationary burner. Conventional seal designs are typically significantly stuffer than the engine suspension system and could, if used, lead to unacceptable transmission of forces between the engine and the burner.

The seal must also be capable of dealing with pressure pulses which may be caused if ignition is delayed following the supply of gas to the burner. Although a safety control system will interrupt the supply if the ignition is unacceptably delayed so that ignition never becomes hazardous, some delay is tolerated. This will cause a build-up of fuel causing higher combustion pressures when ignition is finally achieved. Further, the seal must withstand high temperatures associated with being in close proximity to the burner.

The present invention is directed to providing a Stirling engine assembly with a seal which overcomes these problems.

According to a first aspect of the present invention a Stirling engine assembly comprises a Stirling engine having a head, a burner surrounding the head of the engine to supply heat to the head, and a seal between the engine and the burner, the seal comprising an annular trough filled with a viscous liquid and extending round and attached to one of the burner or engine, and an annular blade depending from the other of the burner or engine inserted into the viscous liquid in the trough, whereby a gas path between the engine and burner around the annular blade is sealed by the viscous liquid.

The use of this viscous fluid provides a seal which will not wear. Minimal vibrational forces are translated from the engine to the burner housing through the liquid. The viscous liquid can be selected so as to be able to withstand the high temperatures associated with the burner gases, and so as not to be corroded by these gases. As it is viscous, it can resist pulses caused by delayed ignition.

The viscous liquid is preferably thixotropic, as this allows the seal to be assembled easily. In addition to presenting a medium which allows advantageous handling properties, the thixotropic liquid, on excitation, becomes free flowing in the immediate vicinity of the agitated blade. This provides sealing and low drag (friction) more typical to a low viscosity medium.

In order to maintain the clearance between the burner and the engine, an annular member, such as an O-ring, is interposed between the blade and the trough. This ensures that the engine and burner retain the correct alignment thereby ensuring maximum thermal performance. As the annular member is not required to perform a sealing function, contact with the blade and the trough can be minimized, thereby reducing the wear on the annular member to negligible levels.

The space between the engine and the burner beneath the burner and above the seal may be filled with insulation in order to reduce the temperature to which the seal is subjected. An annular heat shield may be provided between the burner and the seal to again provide better thermal protection for the seal.

According to a second aspect of the present invention there is provided a Stirling engine assembly comprising a Stirling engine having a head, a burner surrounding the head of the engine to supply heat to the head, and a seal between the engine and the burner, the seal being provided by a hollow o-ring sandwiched between the engine and burner.

The hollow o-ring provides a seal, while still having the necessary flexibility to prevent transmission of vibrations from the Stirling engine to the burner.

Examples of Stirling engine assemblies constructed in accordance with the present invention will now be described with reference to the accompanying drawings, in which.

Figure 1:
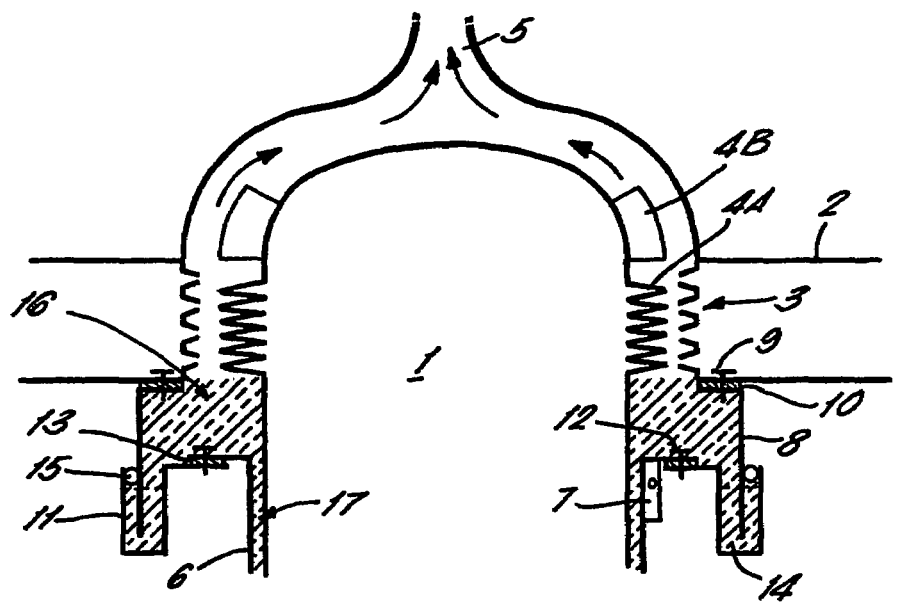
FIG. 1 is a schematic cross-section through the engine head assembly.

Most aspects of the Stirling engine assembly are well known in the art, and will not be described in detail here.

The assembly comprises two main components, namely the Stirling engine 1 and the burner assembly 2 which surrounds the head of the engine. Gas is supplied to the burner assembly and is ignited at outlet 3 to heat fins 4a, 4b on the head of the engine 1. The fins comprise a number of annular fins 4a, and a number of vertical fins 4b arranged around the head as disclosed in the co-pending Application No. GB 0020012.1. Once the exhaust gases have passed through the fins, they pass out through the exhaust gas outlet 5.

The engine 1 is mounted on an engine support 6 and is held in place by a clamping ring 7.

The sealing arrangement comprises a downwardly depending annular blade 8 which is attached to the lower surface of the burner 2 by a plurality of fasteners 9 each protected by a ceramic paper gasket 10. The blade may be, for example, steel or ceramic. An annular trough 11 is fastened around the engine housing 6 by a plurality of fasteners 12 similarly protected by ceramic paper gaskets 13. The trough 11 is filled with a viscous liquid 14 such as a commercially available silicone valve seal compound suitable for operation over a range of temperatures, e.g. from −40° C. to 300° C. and chemically resistant to the burner gases. The boiling point of the sealant must be above the operating temperature of the seal, in this case it must be above 300° C. The blade 8 dips into the viscous liquid 13 but is held clear of the bottom of the trough, such that the viscous liquid provides a barrier between the heater head and the surroundings. An O-ring 15 surrounds the blade 8 and locates above the viscous liquid 14 so as to maintain radial alignment between the engine 1 and the burner 2. Although the O-ring is shown on the radially outer side of the blade 8 it could alternatively or additionally be provided on the radially inner side.

The space between the engine 1, burner 2 and seal assembly beneath the fins 4a is filled with insulation, such as ceramic paper insulation 16 so as to protect the seal assembly from the full burner temperature. The insulation extends into a gap 17 between the engine 1 and the engine support 6. An annular heat shield (not shown) may alternatively or additionally be provided.

Figure 2:
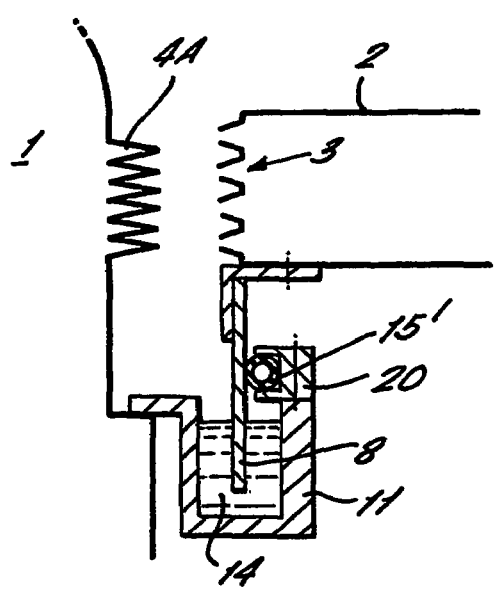
FIG. 2 is a schematic cross-section through an alternative seal arrangement.

FIG. 2 shows an alternative arrangement to the example shown in FIG. 1. In this case, the o-ring 15' held against the blade 8 by an annular retainer 20 attached to the upper outer lip of the trough 11. This provides a more secure way of holding the o-ring seal in place, and allows the use of a less viscous sealant. Otherwise the aspects of this design are the same as those shown in FIG. 1.

Figure 3:
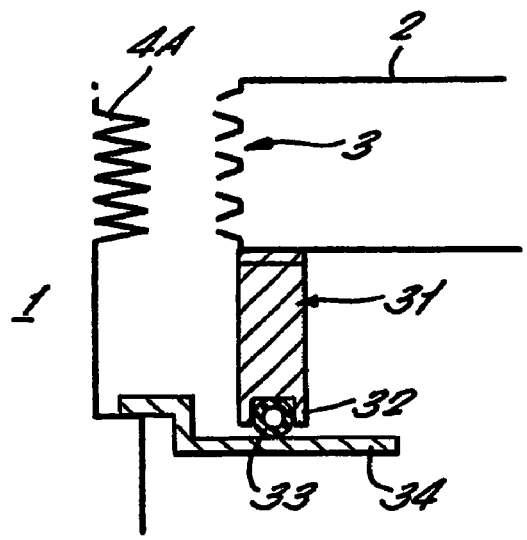
FIG. 3 is a cross-section through a first seal arrangement according to a second aspect of the invention.

An arrangement according to the second aspect of the invention is shown in FIG. 3. In this case, the Stirling engine 1, burner 2 and outlet 3 are as shown in the previous drawings. However, on this occasion, the sealing arrangement is different. An annular ceramic holder 31 is attached to the lower side of the heater 2. A groove 32 in which a hollow O-ring 33 is located is provided on the underneath surface of the annular block 31. The o-ring 33 seals against an annular bracket 34 which is attached to and surrounds the head of the Stirling engine 1.

Figure 4:
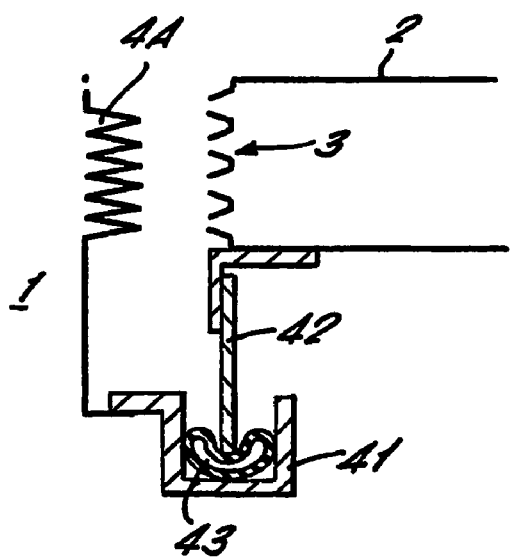
FIG. 4 is a cross-section through a second seal arrangement according to a second aspect of the invention.

A further alternative is shown in FIG. 4. This has an annular trough 41 surrounding the Stirling engine 1, and an annular blade 42 attached to the underside of the burner 2. In this respect, the design is much the same as that shown in FIGS. 1 and 2. However, in place of the viscous liquid is a hollow O-ring 43 in the bottom of the trough 41. The blade 42 is inserted into the trough 41 so as to deform the o-ring 43 as shown in FIG. 4.

The o-rings used in FIGS. 3 and 4 are made of a material such as an extreme high temperature silicon rubber capable of operating at temperatures up to 315° C. The outside diameter will be between 5 and 15 mm, with wall thicknesses from 0.5 mm to 1.5 mm.

Although not shown in FIGS. 3 and 4, the ceramic insulation described with reference to FIG. 1 is also present in these examples.

What is claimed is:

1. A Stirling engine assembly comprising a Stirling engine having a head, a burner surrounding the head of the engine to supply heat to the head, and a seal which seals the space between the engine and the burner, the seal comprising an annular trough filled with a viscous liquid and extending round and attached to one of the burner or engine, and an annular blade depending from the other of the burner or engine inserted into the viscous liquid in the trough, whereby a gas path between the engine and burner around the annular blade is sealed by the viscous liquid.

2. An engine assembly according to claim 1, wherein the viscous liquid is a viscous thixotropic liquid.

3. An engine assembly according to claim 1, wherein an annular member is interposed between the blade and the trough.

4. An engine assembly according to claim 1, wherein the space between the engine and the burner beneath the burner and above the seal is filled with insulation.

5. An engine assembly according to claim 1, wherein an annular heat shield is provided between the burner and the seal.

6. An engine assembly comprising a Stirling engine having a head, a burner surrounding the head of the engine to supply to the head, and a seal which seals the space between the engine and the burner, the seal being provided by a hollow O-ring sandwiched between the engine and the burner.

* * * * *